United States Patent
Hogan et al.

(10) Patent No.: US 12,412,170 B2
(45) Date of Patent: Sep. 9, 2025

(54) SYSTEM FOR STORE AND FORWARD IN POINT OF SALE TRANSACTIONS

(71) Applicant: Toshiba Global Commerce Solutions Holdings Corporation, Tokyo (JP)

(72) Inventors: Patricia S. Hogan, Raleigh, NC (US); Vipulkumar Manubhai Chotaliya, Morrisville, NC (US); Micah B. Clark, Corona, CA (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 132 days.

(21) Appl. No.: 17/488,717

(22) Filed: Sep. 29, 2021

(65) Prior Publication Data

US 2023/0102748 A1   Mar. 30, 2023

(51) Int. Cl.
  *G06Q 20/38* (2012.01)
  *G06Q 20/20* (2012.01)
  *G06Q 20/32* (2012.01)
(52) U.S. Cl.
  CPC ..... *G06Q 20/38215* (2013.01); *G06Q 20/209* (2013.01); *G06Q 20/3276* (2013.01); *G06Q 20/3278* (2013.01)
(58) Field of Classification Search
  None
  See application file for complete search history.

(56) References Cited

U.S. PATENT DOCUMENTS

| | | | |
|---|---|---|---|
| 9,805,370 B1* | 10/2017 | Quigley | H04W 4/80 |
| 10,366,378 B1* | 7/2019 | Han | G06Q 20/204 |
| 2014/0180929 A1* | 6/2014 | Ohnishi | G06Q 20/38215 |
| | | | 705/40 |
| 2016/0085955 A1 | 3/2016 | Lerner | |
| 2017/0039557 A1* | 2/2017 | Murphy | G06Q 20/3278 |
| 2017/0286992 A1* | 10/2017 | Lounsbury, Jr. | G06Q 30/0238 |
| 2018/0330360 A1* | 11/2018 | Chen | G06Q 20/3263 |

(Continued)

FOREIGN PATENT DOCUMENTS

| | | |
|---|---|---|
| CN | 102893297 A | 1/2013 |
| WO | 2018175058 A1 | 9/2018 |
| WO | WO-2020089590 A1 * | 5/2020 ............. G06Q 20/20 |

OTHER PUBLICATIONS

Ivanov, N, et al., "System-Wide Security for Offline Payment Terminals", Michigan State University, Jul. 18, 2021. (Year: 2021).*

*Primary Examiner* — Clay C Lee
(74) *Attorney, Agent, or Firm* — Patterson + Sheridan, LLP (57) ABSTRACT

Aspects described herein include a method (and associated system and computer program product) comprises receiving an amount of a transaction from a point of sale (POS) terminal, and receiving, at a payment terminal, one or more user inputs comprising payment presentation information for the transaction. The method further comprises communicating the payment presentation information to a payment processing service to complete processing of the transaction. The method further comprises determining that the payment presentation information is not received at the payment processing service, and in response, encrypting the payment presentation information and transmitting the encrypted payment presentation information from the payment terminal to an external device.

20 Claims, 4 Drawing Sheets

(56) References Cited

U.S. PATENT DOCUMENTS

| | | | |
|---|---|---|---|
| 2019/0272545 A1* | 9/2019 | Ozvat | G06Q 20/4016 |
| 2021/0019734 A1* | 1/2021 | Vukich | G06Q 20/3224 |
| 2021/0081943 A1* | 3/2021 | Keegan | G06Q 20/0457 |
| 2021/0287201 A1* | 9/2021 | Hernandez | G06Q 20/385 |
| 2025/0036801 A1* | 1/2025 | Kirsch | G06F 21/31 |

* cited by examiner

SYSTEM FOR STORE AND FORWARD IN POINT OF SALE TRANSACTIONS

BACKGROUND

Checkout systems include diverse functionality that enables customers and/or associate to perform the various functions of a checkout transaction, such as scanning items, weighing items, bagging items, presenting payment, and providing a paper or electronic receipt. However, consolidating or streamlining the functionality of checkout systems may be challenging, as security considerations may require isolation of hardware systems supporting different functions. For example, the Payment Card Industry (PCI) Security Standards Council maintains a PCI Data Security Standard (DSS) to ensure that credit card information entered by a customer is securely processed, stored, and transmitted. To ensure PCI DSS compliance, a checkout system may isolate a payment system (e.g., credit card reader and/or pinpad) from the other hardware of the point of sale (POS) terminal. Occasionally, the payment system may be unable to complete the transaction at the time of the transaction. To minimize inconvenience or frustration to the customer, the transaction may be provisionally approved and the relevant transaction information stored by the payment system until the transaction can be completed.

SUMMARY

According to one embodiment, a method comprises receiving an amount of a transaction from a point of sale (POS) terminal, and receiving, at a payment terminal, one or more user inputs comprising payment presentation information for the transaction. The method further comprises communicating the payment presentation information to a payment processing service to complete processing of the transaction. The method further comprises determining that the payment presentation information is not received at the payment processing service. Responsive to determining that the determining that the payment presentation information is not received, encrypting the payment presentation information and transmitting the encrypted payment presentation information from the payment terminal to an external device.

According to another embodiment, a system comprises a payment terminal comprising an input device, and one or more computer processors configured to receive an amount of a transaction from a point of sale (POS) terminal, and receive, using the input device, one or more user inputs comprising payment presentation information for the transaction. The one or more computer processors are further configured to communicate the payment presentation information to a payment processing service to complete processing of the transaction. The one or more computer processors are further configured to determine that the payment presentation information is not received at the payment processing service. Responsive to determining that the payment presentation information is not received, the one or more computer processors are further configured to encrypt the payment presentation information, and transmit the encrypted payment presentation information from the payment terminal to an external device.

According to another embodiment, a computer program product comprising computer-readable code, which when executed by one or more computer processors of a payment terminal, performs an operation comprising: receiving an amount of a transaction from a point of sale (POS) terminal, and receiving, from an input device of the payment terminal, one or more user inputs comprising payment presentation information for the transaction. The operation further comprises communicating the payment presentation information to a payment processing service to complete processing of the transaction. The operation further comprises determining that the payment presentation information is not received at the payment processing service. Responsive to determining that the payment presentation information is not received, the operation further comprises encrypting the payment presentation information, and transmitting the encrypted payment presentation information from the payment terminal to an external device.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

Aspects of the current disclosure relate to a method comprising receiving an amount of a transaction from a POS terminal and receiving, at a payment terminal, one or more user inputs comprising payment presentation information for the transaction. The method further comprises attempting to communicate the payment presentation information to a payment processing service to complete processing of the transaction. Responsive to determining that the processing of the transaction cannot be completed, the method further comprises encrypting the payment presentation information and transmitting the encrypted payment presentation information from the payment terminal to an external device.

In some embodiments, determining that the processing of the transaction cannot be completed comprises one of detecting a fault in the payment terminal, or detecting that the payment processing service is unavailable.

In some embodiments, the external device is the POS terminal, and transmitting the encrypted payment presentation information comprises transmitting store-and-forward (SAF) information for the transaction to the POS terminal, where the encrypted payment presentation information is included in the SAF information. The SAF information may be stored in a transaction log entry for the transaction. In some cases, a flag may be set in the transaction log entry to indicate that the transaction log entry includes the SAF information. The POS terminal regularly communicates its transaction log information to the consolidated transaction log on the controller. During a reconciliation process, the SAF information may be retrieved from the POS terminal or the consolidated transaction log (TLOG) on the controller, the payment presentation information extracted from the transaction log or the consolidated transaction log, and the payment presentation information communicated to the payment processing service.

In some embodiments, the POS terminal transmits a control signal to a printer device to print a barcode, such as a Universal Product Code or Quick Response (QR) code, with the encrypted payment presentation information. The printed barcode may be stored and later scanned to complete the transaction.

Beneficially, the method is robust to failures or other malfunctions of the payment terminal, where the transaction information stored locally on the payment terminal (and the corresponding value of the transactions) might be otherwise lost. By using encryption, the payment presentation information may be transmitted to the POS terminal, to the controller, or to other external device(s) without changes invoking audits or recertification of the POS terminal.

By storing the encoded payment presentation information at the POS terminal or at the controller, the encoded payment presentation information may be offloaded from the payment terminal. Assuming the payment terminal is functional, the processing capability and/or memory of the payment terminal (which may be limited relative to that of the POS terminal and/or the controller) may be freed to continue handling payments for subsequent transactions at the POS terminal. In cases where the payment terminal is faulty, offloading the encoded payment presentation information may allow the payment terminal to be repaired or replaced (and the full functionality of the POS system restored) more quickly. Beneficially, offloading the payment presentation information (in encrypted form) from the payment terminal to the POS terminal and/or the controller may be effective to improve the availability and/or responsiveness of the POS system as a whole.

In some cases, storing the encoded payment presentation information away from the payment terminal permits the reconciliation process to be completed more quickly and/or more reliably. For example, the POS terminal and/or the controller may have greater processing capability and/or memory than the payment terminal. In some cases, the payment terminal may be faulty, which can further slow the communication of the payment presentation information with the payment processing service. In some cases, the controller may be able to perform the reconciliation process without initiating an external communication to the POS terminal and/or the payment terminal to retrieve the encoded payment presentation information.

While features of the checkout system are generally discussed within the context of a shopping environment, such as within a retail store, it is contemplated that the techniques disclosed herein may be applied to other environments (some non-limiting examples include libraries, museums, classrooms, hospitals, etc.).

Figure 1:
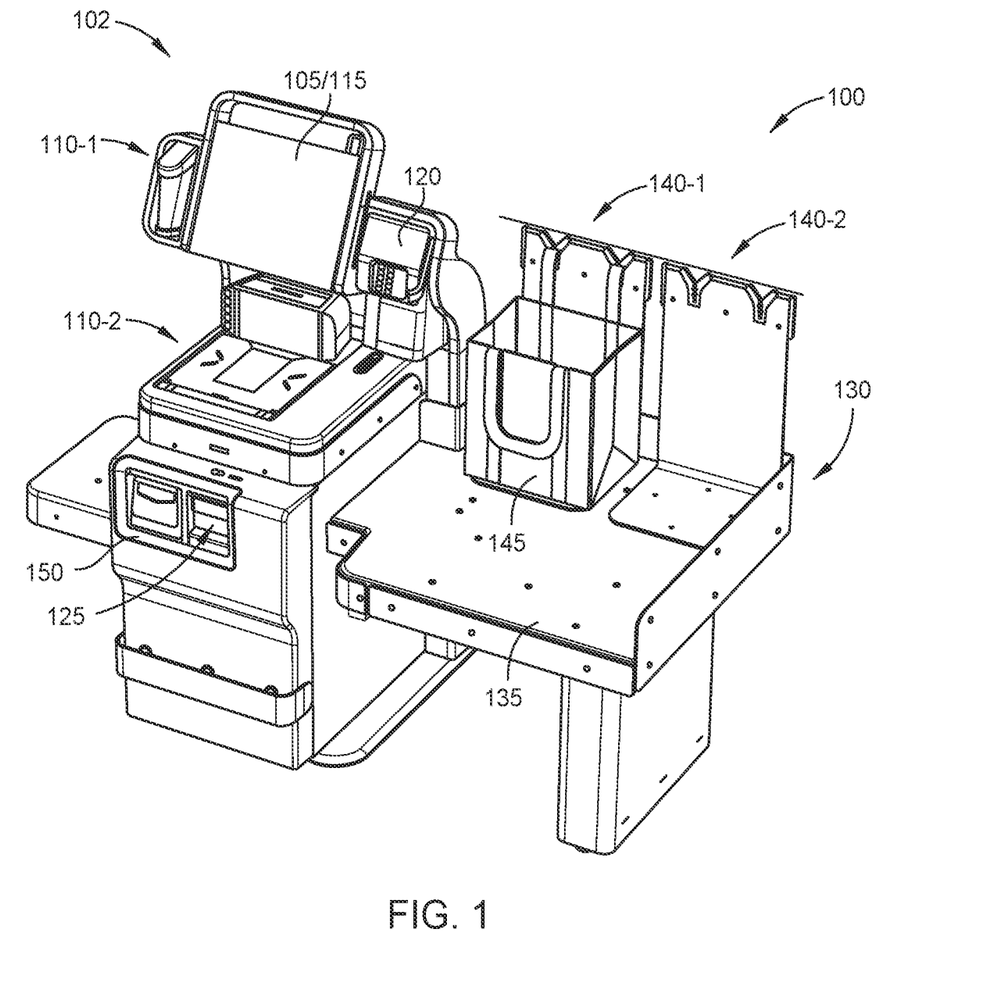
FIG. 1 illustrates an exemplary implementation of a self-checkout system, according to one or more embodiments.

FIG. 1 illustrates an exemplary implementation of a checkout system 100, according to one or more embodiments. As shown, the checkout system 100 is implemented as a self-checkout system that generally includes functionality that enables a customer and/or an associate to perform some or all of the stages of a self-checkout transaction, such as scanning items, weighing items, bagging items, presenting payment, and providing a paper or electronic receipt. However, the features and techniques discussed herein may be applied to other types of checkout systems (e.g., cash register-based systems operated by store associates).

The checkout system 100 comprises a POS terminal 102 having a display system 105 that presents information viewable by a user (e.g., a customer or an associate) during various stages of a self-checkout transaction. The display system 105 may use any suitable display technology, such as a liquid crystal display (LCD), an organic light-emitting diode (OLED) display, and so forth. The display system 105 is communicatively coupled with one or more computer processors, which may be integrated into the POS terminal 102 or external to the POS terminal 102. For example, the one or more computer processors may be included in a computing device integrated with the POS terminal 102, which may be further networked with other computing devices. In some embodiments, the display system 105 includes an input device 115 that receives inputs from the user during the self-checkout transaction. For example, the input device 115 may include a touch-sensitive screen using any suitable sensing technology, such as capacitive sensing, resistive sensing, and so forth.

The POS terminal 102 further comprises one or more item scanners 110-1, 110-2 (collectively or generically, item scanner(s) 110). Each item scanner 110 is communicatively coupled with the one or more computer processors, and in conjunction with the one or more computer processors visually identifies items during scanning. For example, each item scanner 110 may detect encoded portions (e.g., a Universal Product Code (UPC) or a Quick Response (QR) code) and/or may compare imagery of the item with reference image(s) to identify a type of the item.

In some embodiments, the item scanner 110-1 comprises a handheld scanner that may be aimed by a user at items to scan the items, and the item scanner 110-2 is integrated into a surface of the POS terminal 102. In some embodiments, the item scanner 110-2 further includes one or more load cells arranged near the surface for measuring weights of items.

The checkout system 100 further comprises a printer 125 that prints or otherwise generates tangible item(s) to the user for the transaction. As shown, the printer 125 is arranged in a forward panel 150 of the checkout system 100 beneath the item scanner 110-2, although the printer 125 may be arranged in any other suitable location. The printer 125 is communicatively coupled with the one or more computer processors. In some embodiments, the printer 125 generates paper receipts for the self-checkout transaction and/or coupons.

The checkout system 100 further comprises a payment terminal 120 that is able to receive electronic payments from a user. In some embodiments, the payment terminal 120 comprises one or more of: a credit card reader, a display device, a PIN pad, a near field communication (NFC) reader, and so forth. In some embodiments, the payment terminal 120 comprises one or more computer processors, a memory, etc. that is distinct from the computing hardware of the POS terminal 102. In this way, the payment terminal 120 may be effectively isolated from the POS terminal 102 to ensure compliance with PCI DSS or other standards.

The checkout system 100 may further comprise a cash receiver in the forward panel 150 that is configured to receive banknotes and/or coins from a user as payment for the self-checkout transaction. In some cases, the cash receiver may be configured to dispense banknotes and/or coins to the user as change.

The checkout system 100 further comprises a bagging area 130 comprising a plurality of bagging stations 140-1, 140-2 (collectively or generically, bagging station(s) 140). Each bagging station 140 includes structure suitable for dispensing, supporting, suspending, and/or retaining single-use shopping bags and/or reusable bags or totes. As shown, the bagging stations 140-1, 140-2 are disposed on a fixed platform 135, and the bagging station 140-1 is engaged with a handle of a reusable tote 145 to retain the reusable tote 145 on the fixed platform 135. Other configurations of the bagging area 130 are also contemplated, such as different numbers and/or arrangements of the bagging stations 140, a rotatable carousel, and so forth.

A user may transport one or more items to the POS terminal 102 to initiate a self-checkout transaction. The user scans the item(s) using the item scanners 110-1, 110-2 and places the item(s) once scanned into the bagging area 130, e.g., into the reusable tote 145 or onto the fixed platform 135. During the self-checkout transaction, the POS terminal 102 may update a list of items included in the self-checkout transaction as the user adds or removes items from the bagging area 130. The POS terminal 102 may also provide guidance (e.g., instructions) to the user via the display system 105. The user may request assistance via inputs to the POS terminal 102 (e.g., touch inputs to the input device 115).

The user may indicate an intent to complete the self-checkout transaction by providing an input to the POS terminal 102 using the input device 115 (e.g., a press of a virtual button). Responsive to the input, the POS terminal 102 may transmit an amount of the self-checkout transaction to the payment terminal 120. To complete the self-checkout transaction, the user may provide one or more inputs to the payment terminal 120 that comprise payment presentation information for the transaction. For example, the user may swipe a credit card in the credit card reader, hold the credit card (or smartwatch, smartphone, etc.) near the NFC reader, manually enter information using the PIN pad or the display device, and so forth.

The payment terminal 120 attempts to communicate the payment presentation information to a payment processing service to complete processing of the transaction. If the communication is successful, the payment terminal 120 may transmit a confirmation token to the POS terminal 102 that is stored with a record for the transaction (e.g., by a controller communicatively coupled with the POS terminal 102). The payment terminal 120 may transmit additional information to the POS terminal 102, e.g., to be printed by the printer 125 and/or logged in a transaction log.

The communication attempt may not be successful for several reasons. For example, the payment terminal may experience a fault or the payment processing service may be unavailable. If the communication is not successful, the payment terminal 120 may provisionally approve the transaction to minimize inconvenience or frustration to the user. For example, the payment terminal 120 may provisionally approve transactions under a certain amount (e.g., 75 USD), and in conventional implementations, the transaction information (including the payment presentation information) may be stored in the memory of the payment terminal 120. The transaction information may be described as "store-and-forward (SAF) information". The transaction may be completed by the payment terminal 120 at a later time (e.g., transmitting the SAF information to the payment processing service during a reconciliation process). Alternatively, the transaction may be completed by the store close application running on the controller processing the consolidated transaction log as part of the store close application to close the business day and resolve any pending SAF transactions.

For conventional implementations of the payment terminal 120, should the payment terminal 120 fail while storing transaction information for one or more transactions, the transaction information (and the corresponding value of the one or more transactions) may be lost. In various embodiments discussed herein, responsive to determining that the processing of the transaction cannot be completed, the payment terminal 120 encrypts the payment presentation information and transmits the encrypted payment presentation information to an external device. In some cases, the external device is the POS terminal 102 and the encrypted payment presentation information is stored in the POS terminal 102 for a later retrieval. In some cases, the external device is the POS terminal 102 and the encrypted payment presentation information is temporarily stored in the POS terminal 102, before being added to the consolidated transaction log on the controller. In some cases, the external device is a printer 125 (e.g., communicatively coupled with the POS terminal 102) that prints a barcode with the encrypted payment presentation information. The printed barcode may be scanned, e.g., using the item scanners 110-1, 110-2, to later complete the transaction.

Figure 2:
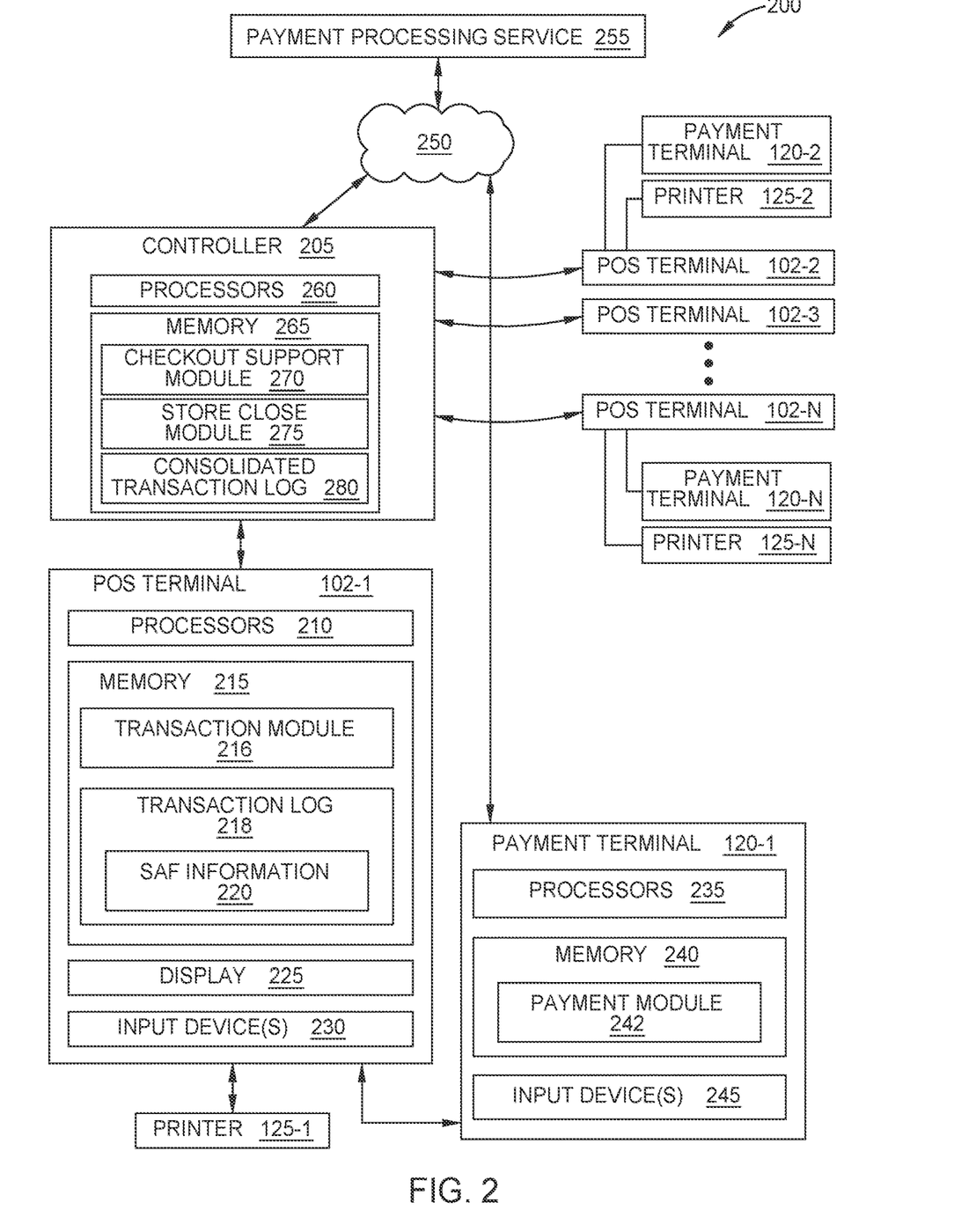
FIG. 2 is a system diagram for a point of sale system, according to one or more embodiments.

In one example, the encrypted payment presentation information may be transmitted from the payment terminal 120 to (or through) the POS terminal 102 and to the consolidated transaction log on controller 205 without changing the configuration of the POS terminal 102 or controller 205 in a manner that invokes an audit or requiring a recertification of the POS terminal 102 or controller 205 under PCI DSS.

FIG. 2 is a system diagram for a POS system 200, according to one or more embodiments. The features of the POS system 200 may be used in conjunction with other embodiments. For example, the POS system 200 may include one or more instances of the POS terminal 102 of FIG. 1.

As shown, the POS system 200 comprises N POS terminals 102-1, 102-2, . . . , 102-N that are communicatively coupled with a controller 205. Each of the POS terminals 102-1, 102-2, . . . , 102-N represents a respective instance of the POS terminal 102. The POS terminal 102-1 comprises one or more computer processors 210, a memory 215, a display 225, and one or more input devices 230.

The one or more computer processors 210 may be implemented in any suitable form, such as a general purpose microprocessor, a controller, an application-specific integrated circuit (ASIC), and so forth. The memory 215 may include a variety of computer-readable media selected for their size, relative performance, or other capabilities: volatile and/or non-volatile media, removable and/or non-removable media, etc.

The display 225 may be any type of dynamic display capable of displaying a visual interface to a user. In some embodiments, the display 225 represents one example of the display system 105 of FIG. 1. The one or more input devices 230 receive inputs from a user during self-checkout transactions. The one or more input devices 230 may have any suitable implementations, such as the input device 115 (e.g., a touch-sensitive screen that may be integrated or overlaid with the display 225) and the item scanners 110-1, 110-2 of FIG. 1.

Each of the POS terminals 102-1, 102-2, . . . , 102-N is communicatively coupled with a respective payment terminal 120-1, 120-2, . . . , 120-N and a respective printer 125-1, 125-2, . . . , 125-N. In some embodiments, each of the payment terminals 120-1, 120-2, . . . , 120-N represents one example of the payment terminal 120 of FIG. 1. In some embodiments, each of the printers 125-1, 125-2, . . . , 125-N represents one example of the printer 125 of FIG. 1.

The payment terminal 120-1 comprises one or more computer processors 235, a memory 240, and one or more input devices 245. Generally, the computer processor(s) 235 may be configured similarly to the computer processor(s) 210, and the memory 240 may be configured similarly to the memory 215. The one or more input devices 245 may include one or more of: a credit card reader, a display device, a PIN pad, a near field communication (NFC) reader, and so forth.

The controller 205 comprises one or more computer processors 260 and a memory 265. Generally, the computer processor(s) 260 may be configured similarly to the computer processor(s) 210, and the memory 265 may be configured similarly to the memory 215. In some embodiments, the controller 205 provides a collective administrative and/or supervisory functionality for the POS terminals 102-1, 102-2, . . . , 102-N. For example, the controller 205 may receive the transaction logs from the POS terminals 102-1, 102-2, . . . , 102-N and maintain a consolidated transaction log allowing particular transactions to be accessed, analysis performed on the various transactions, and so forth.

In some embodiments, the controller 205 further operates to maintain an inventory system for the environment. For example, the controller 205 may update inventory levels based on item(s) included in self-checkout transactions performed at the various POS terminals 102. In some embodiments, the controller 205 comprises one or more sensors that may be used to maintain the inventory system. For example, the one or more sensors may comprise visual sensors distributed through the environment that monitor user interactions with various items in the environment.

The memory 215, 240, 265 may include one or more modules for performing various functions described herein. In one embodiment, each module includes program code that is executable by the respective one or more computer processors 210, 235, 260. In another embodiment, each module is partially or fully implemented in hardware (i.e., circuitry) or firmware of the respective POS terminal 102-1, payment terminal 120-1, or controller 205 (e.g., as circuitry within the one or more computer processors 210, 235, 260). However, other embodiments of the POS system 200 may include modules that are partially or fully implemented in other hardware or firmware, such as hardware or firmware included in one or more other computing devices communicatively coupled with the POS terminal 102-1, and so forth. Stated another way, the overall functionality of the one or more modules may be distributed among other devices of the POS system 200.

As shown, the memory 215 comprises a transaction module 216, the memory 240 comprises a payment module 242, and the memory 265 comprises a checkout support module 270 and a store close module 275. The transaction module 216 generally receives information related to the current transaction through the one or more input devices 230 and/or from the controller 205, and maintains or updates the list of item(s) for the current transaction. For example, the transaction module 216 may update the list as the user scans items at the self-checkout station, and the list may be compared with a virtual cart maintained by the controller 205 to determine whether an audit of the current transaction should be performed.

The transaction module 216 further maintains a transaction log 218 in the memory 215 using the information for the current transaction. In some embodiments, the transaction module 216 updates the transaction log 218 with a new transaction entry when the current transaction is completed (e.g., after payment presentation information is provided). The entries of the transaction log 218 may be intermittently transmitted to the controller 205 and stored in a consolidated transaction log 280 in the memory 265.

The checkout support module 270 processes new entries from the transaction log 218 of the various POS terminals 102-1, 102-2, . . . , 102-N, and stores the new entries in the consolidated transaction log 280. In some embodiments, the controller 205 operates the checkout support module 270 substantially continuously while the POS terminals 102-1, 102-2, . . . , 102-N are operating. The checkout support module 270 may further update accounting with transaction details.

The store close module 275 manages the accounting for predetermined periods, e.g., managing the consolidated transaction log 280 for the current business day. In some embodiments, the controller 205 operates the store close module 275 at the close of a business day, e.g., closing the current business day and opening a next business day.

In some embodiments, the payment module 242 receives an amount of the transaction from the POS terminal 102-1. Using the one or more input devices 245, the payment module 242 receives one or more user inputs comprising payment presentation information for the transaction. The payment module 242 attempts to communicate, through a network 250, the payment presentation information to a payment processing service 255 to complete processing of the transaction.

The network 250 represents one or more networks of any suitable types, such as the Internet, a local area network (LAN), a wide area network (WAN), and/or a wireless network. Each of the communicative links with the network 250 may have any suitable implementation, such as copper transmission cable(s), optical transmission fiber(s), wireless transmission, router(s), firewall(s), switch(es), gateway computer(s), and/or edge server(s).

The payment processing service 255 represents one or more computing devices that communicate with a payment authorization service and with the payment terminals 120-1, 120-2, . . . , 120-N associated with each of the POS terminals 102-1, 102-2, . . . , 102-N. In the example of a credit card, the payment authorization service may be an issuing bank such as a bank, a credit union, or other financial institution. In some examples, the payment processing service 255 may communicate with the payment authorization service through one or more intermediate entities, such as through a card association.

The payment module 242 determines when the processing of the transaction can be completed. In some embodiments, determining that the processing of the transaction cannot be completed comprises one of detecting a fault in the payment terminal 120-1 or detecting that the payment processing service 255 is unavailable. In some cases, the payment processing service 255 is determined to be unavailable when there are errors in one or more connections with the network 250 and/or the computing device(s) of the payment processing service 255 are unavailable.

Responsive to determining that the processing of the transaction cannot be completed, the payment module 242 encrypts the payment presentation information and transmits the encrypted payment presentation information from the payment terminal 120-1 to an external device. In some embodiments, the payment module 242 encrypts the payment presentation information only for those transactions that are less than a predefined amount (the payment module 242 may transmit a rejection (or a "decline") for transactions with a greater amount than the predefined amount). The payment module 242 may use any suitable encryption scheme for the payment presentation information.

In some embodiments, when the payment terminal 120-1 is first connected to the POS terminal 102-1, the payment terminal 120-1 registers as the authorized payment terminal 120-1 for the POS terminal 102-1. If another unauthorized payment terminal (e.g., the payment terminal 102-2) is subsequently connected to the POS terminal 102-1, the unauthorized payment terminal is not recognized, and the POS terminal 102-1 will not allow payment transactions to be performed on the unauthorized payment terminal.

In some embodiments, the payment terminal 120-1 also registers with the payment processing service 255 so that the payment terminal 120-1 is authorized to send payment transactions to the payment processing service 255. For example, the payment processing service 255 may validate a store number, a POS terminal number, and/or a serial number of the payment terminal 120-1 when authorizing the payment terminal 120-1.

In some embodiments, the payment processing service 255 may transmit a token or private encryption key to the payment terminal 120-1 after authorization. The token or private encryption key may be included as part of the payload sent by the payment terminal 120-1 to the payment processing service 255 with payment requests. The payment processing service 255 may identify the payment terminal 120-1, and authorize the payment request, using the token or private encryption key.

In some embodiments, the payment module 242 uses the token or private encryption key to encrypt the payment presentation information, and the payment processing service 255 is able to decrypt the payment presentation information. Notably, the POS terminal 102-1 and other devices of the POS system 200 do not know the token or private encryption key, and therefore the payment presentation information may be securely transmitted through the POS system 200.

In some embodiments, the external device comprises the POS terminal 102-1, and the encrypted payment presentation information may be included in SAF information 220 that is stored in the memory 215. In some embodiments, one or more entries in the transaction log 218 comprise one or more flags, and a flag is set when the transaction log 218 includes the SAF information 220. The SAF information 220 included in the transaction log 218 may also be copied to the consolidated transaction log 280 on the controller 205. The SAF information 220 may include other information associated with the current transaction. In some embodiments, the external device comprises the printer 125-1, and the encrypted payment presentation information is transmitted through the POS terminal 102-1 to the printer 125-1, which generates a barcode such as a QR code. In some embodiments, an associate may retain the printed barcode and later attempt to complete the transaction.

In some embodiments, the store close module 275 accesses the consolidated transaction log 280 and sends any entries from the consolidated transaction log 280 having a set flag to the payment processing service 255. When the payment processing service 255 acknowledges that the SAF information 220 has been successfully reconciled (or processing), the flag would be cleared in the consolidated transaction log 280.

Figure 3:
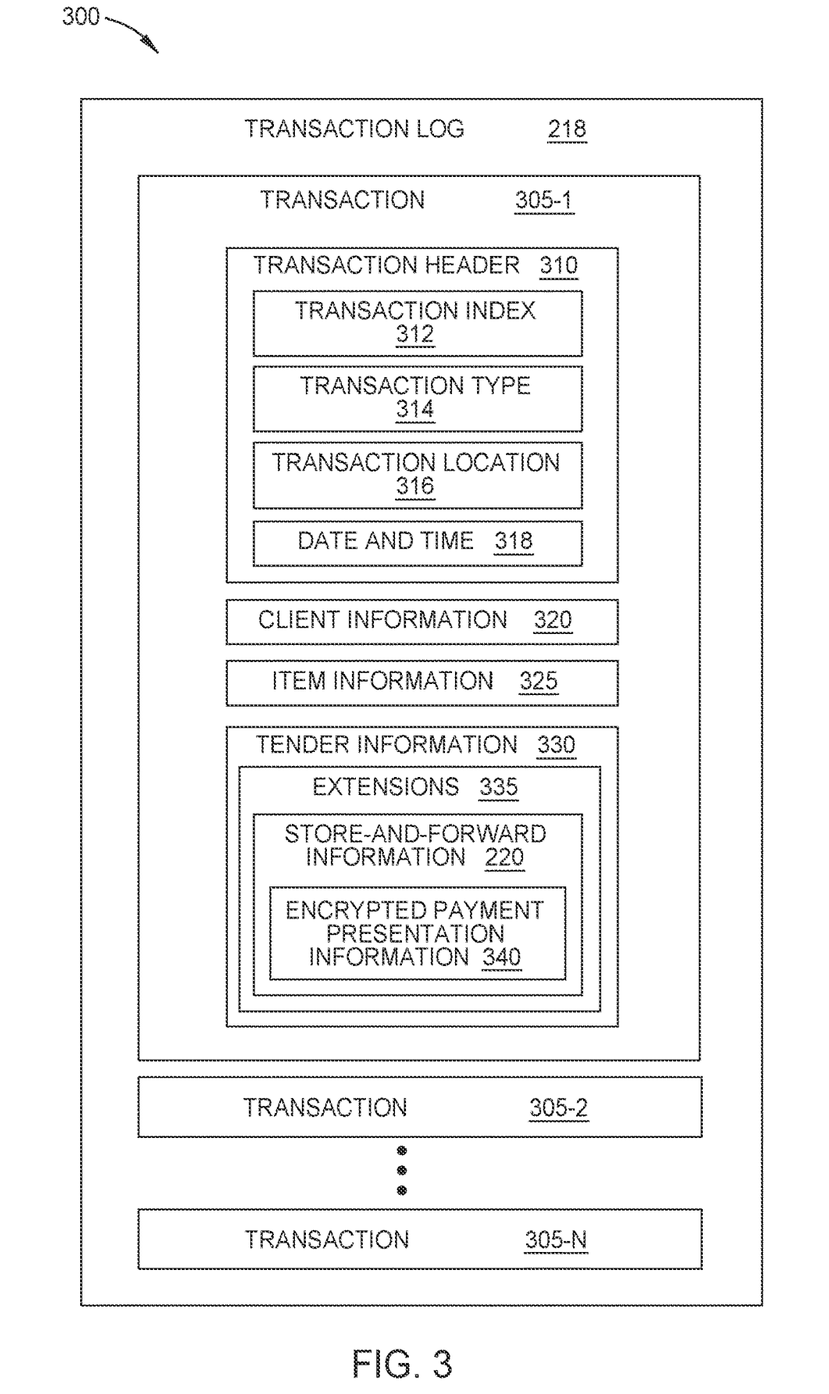
FIG. 3 is a block diagram of a transaction log for a point of sale system, according to one or more embodiments.

FIG. 3 is a block diagram 300 of a transaction log 218 for a POS system, according to one or more embodiments. The features of the transaction log 218 may be used in conjunction with other embodiments.

The transaction log 218 comprises a plurality of transactions 305-1, 305-2, . . . , 305-N, each of which includes a number of different predefined data fields. As shown, the transaction 305-1 comprises a transaction header 310, customer information 320, item information 325, and tender information 330, although other compositions of data are also contemplated.

The transaction header 310 comprises a transaction index 312 (e.g., a counter that uniquely identifies the POS transaction for a particular store and a particular business day). The transaction header 310 further comprises a transaction type 314 (e.g., a code that indicates the type of the business transaction such as a sale, a return, or a financial transaction). The transaction header 310 further comprises a transaction location 316, such as a store ID (e.g., a unique identifier of the environment where the transaction 305-1 occurs), an ID of the POS terminal, and so forth. The transaction header 310 further comprises a date and time 318 (e.g., a business day, a begin time stamp, and/or an end time stamp).

The transaction 305-1 further comprises customer information 320 (e.g., a unique customer identifier, a method of entry of the customer identifier), and item information 325 (e.g., identifiers for one or more scanned items, quantities of the item(s), discounts, taxes, loyalty information, commission information). The transaction 305-1 further comprises tender information 330, such as credit card information, debit information, coupon information, and so forth.

Each of the transactions 305-1, 305-2, . . . , 305-N may further include one or more extensions that represent predefined locations capable of storing information to augment one or more of the predefined data fields. In some embodiments, the tender information 330 comprises an extension 335, and the SAF information 220 is included in the extension 335 when the payment terminal determines that the processing of the transaction cannot be completed. In some embodiments, the SAF information 220 comprises encrypted payment presentation information 340 that is provided by a user and encrypted by the payment terminal. In some embodiments, the entry for the transaction 305-1 comprises one or more flags, and a flag is set when the transaction log entry includes the SAF information 220.

The payment presentation information may later be communicated to the payment processing service to complete payment for the transaction. In some embodiments, during a reconciliation (or settlement) process, the SAF information 220 is retrieved from the POS terminal by the payment terminal. The payment terminal extracts the encrypted payment presentation information from the retrieved SAF information, and communicates the encrypted payment presentation information to the payment processing service.

Referring also to FIG. 2, in some embodiments, the store close module 275 of FIG. 2 when closing the accounting for a business day reads the consolidated transaction log 280 for the business day and identifies any unprocessed SAF transactions (e.g., indicated by a flag). If the store close module 275 identifies unprocessed SAF transactions, the store close module 275 forwards the encrypted payment presentation information from the corresponding transaction log records to the payment processing service 255. If the payment processing service 255 successfully processes the transaction, the payment processing service 255 may send an acknowledgement back to the store close module 275. The store close application on receiving the payment processing service's acknowledgement for a transaction could clear the SAF flag for that transaction in the consolidated transaction log.

The flag for the transaction 305-1 (and the SAF information 220) may be cleared after the transaction is completed (e.g., once a confirmation token is received from the payment terminal and stored in the tender information 330, or once the payment processing service transmits an acknowledgement for the transaction to the store close module 275). In some embodiments, if (1) no acknowledgement is received from the payment processing service 255, (2) all of the offline transactions are not acknowledged, or (3) the payment processing service 255 is not reachable, then the store close module 275 may alternately submit the entire consolidated transaction log 280 to the payment processing service 255 for reconciliation.

Figure 4:
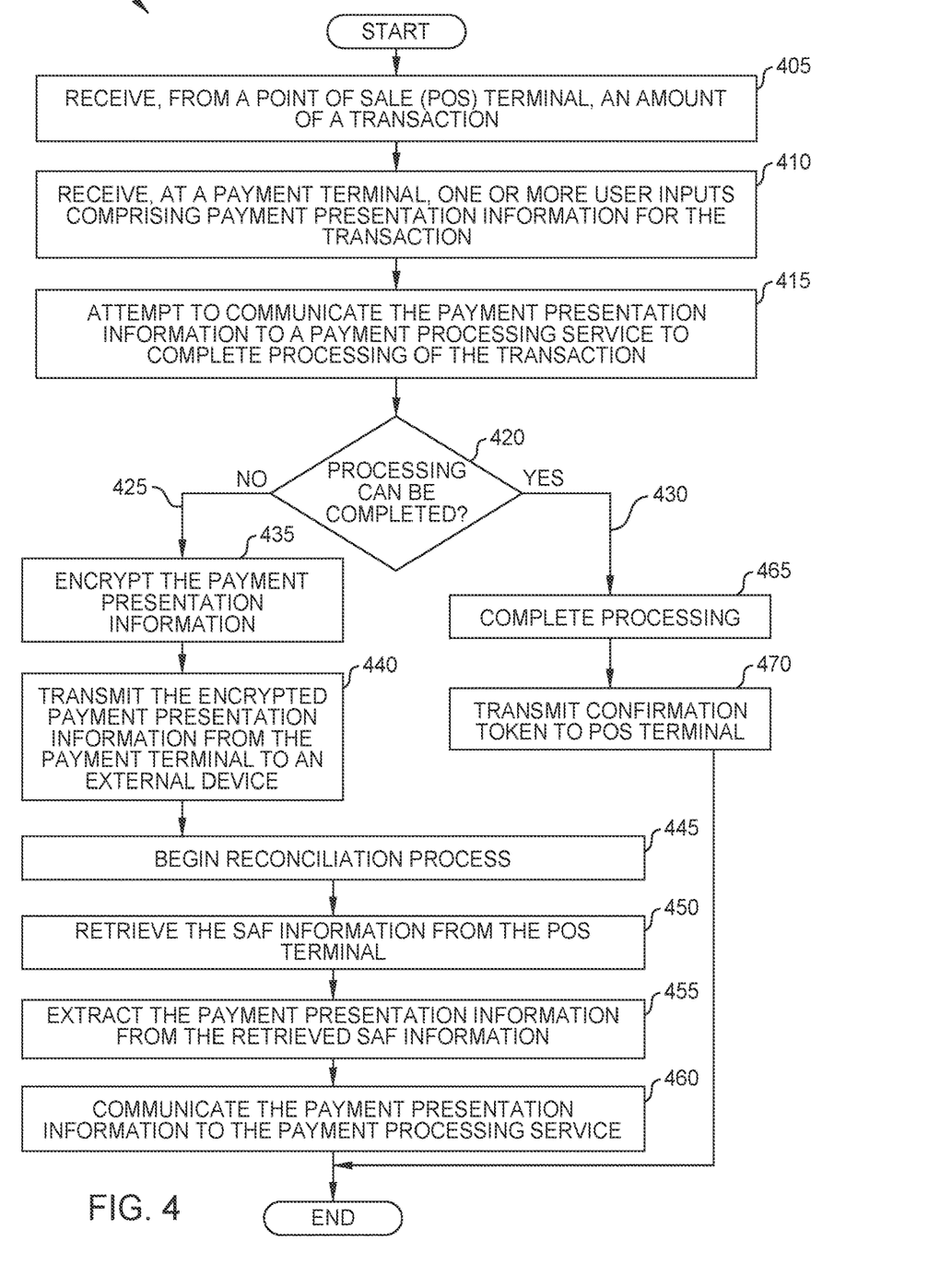
FIG. 4 is a method of processing payment for a transaction, according to one or more embodiments.

FIG. 4 is a method 400 of processing payment for a transaction, according to one or more embodiments. The method 400 may be used in conjunction with other embodiments, e.g., performed by the payment module 242 of the payment terminal 120-1 of FIG. 2 and/or by the store close module 275 operating on the controller 205.

The method 400 begins at block 405, where an amount of a transaction is received from a POS terminal. At block 410, one or more user inputs are received at a payment terminal. The one or more user inputs comprise payment presentation information for the transaction. In some embodiments, one or more user inputs comprise swiping a credit card in a credit card reader, holding the credit card (or smartwatch, smartphone, etc.) near an NFC reader, or manually entering information using a PIN pad or a display device.

At block 415, the payment terminal attempts to communicate the payment presentation information to a payment processing service to complete processing of the transaction. At block 420, the payment terminal determines when the processing can be completed (e.g., whether the payment processing service is available and/or whether the payment terminal is fully functional). If the processing can be completed ("Yes") (e.g., the payment processing service receives the payment presentation information and approves the transaction), the method 400 follows branch 430 to block 465, where the processing is completed. In some embodiments, completing processing comprises receiving a confirmation (or "authorization") from the payment processing service. At block 470, the payment terminal transmits a confirmation token to the POS terminal, which in some cases includes information from the authorization from the payment processing service.

If the processing cannot be completed at block 420 ("No") (e.g., the payment processing service does not receive the payment presentation information), the method 400 follows branch 425 to block 435, where the payment terminal encrypts the payment presentation information. In some embodiments, the payment terminal encrypts the payment presentation information using a token, private encryption key, or other value that is specific to the payment terminal and the payment processing service. In some embodiments, encrypting the payment presentation information occurs responsive to determining that the amount of the transaction is less than a predefined amount. In some embodiments, the payment terminal also transmits a provisional approval to the POS terminal when the amount is less than the predefined amount. In some embodiments, the payment module transmits a rejection (a "decline") when the transaction has a greater amount than the predefined amount. The payment module may further prompt the user for an alternative payment.

At block 440, the payment terminal transmits the encrypted payment presentation information to an external device. In some embodiments, the external device is the POS terminal, and the encrypted payment presentation information may be included in SAF information that is stored by the POS terminal. In some embodiments, the SAF information (or a copy thereof) may be stored in a consolidated transaction log on the controller 205. By storing the encoded payment presentation information at the POS terminal or at the controller, the encoded payment presentation information may be offloaded from the payment terminal, allowing the processing capability and/or memory of the payment terminal to be freed up for subsequent transactions and/or allowing the payment terminal to be repaired or replaced more quickly. In other embodiments, the external device is a printer that prints a barcode with the encrypted payment presentation information. For example, the POS terminal transmits a control signal to the printer to print a barcode, such as a UPC, QR code, or other matrix barcode.

At block 445, the payment terminal or the store close module 275 begins a reconciliation process. For example, the payment terminal may periodically attempt to complete the transaction, or the reconciliation process may occur at the end of the business day or some other predefined time. At block 450, the payment terminal retrieves the SAF information from the POS terminal. In alternate implementations, the store close application running on controller 205 at the end of the day, retrieves the SAF information from the consolidated transaction log, by searching for transaction log records that have the SAF flag set. By storing the encoded payment presentation information within the SAF information—and away from the payment terminal—the reconciliation process in some cases may be completed more quickly and/or more reliably by relying on fewer external communications with the POS terminal and/or the payment terminal.

In some alternate implementations, the payment terminal retrieves the encrypted payment presentation information from the POS terminal responsive to scanning the printed barcode. For example, an associate may retain the printed barcode and later scan the barcode to attempt to complete the transaction. At block 455, the payment terminal or the store close module extracts the encrypted payment presentation information from the retrieved SAF information. At block 460, the payment terminal or the store close module communicates the encrypted payment processing information to the payment processing service. In some embodiments, the payment processing service decrypts the encrypted payment processing information using the token, private encryption key, or other value specific to the payment terminal and the payment processing service. The method ends following completion of block 460 or block 470.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of handling a communication failure between a payment terminal and a payment processing service, the method comprising:
    receiving, at the payment terminal and from a point of sale (POS) terminal, an amount of a transaction, wherein the payment terminal includes a computer processor that is isolated from a computer processor of the POS terminal to comply with a payment card industry (PCI) data security standard, wherein the payment terminal further includes an input device comprising one or more of: a credit card reader, a display device, and a pin pad;
    receiving, at the payment terminal, one or more user inputs comprising payment presentation information for the transaction, wherein the one or more user inputs comprise swiping a credit card in the credit card reader, holding the credit card proximate the credit card reader, or manually entering the payment presentation information using the pin pad or the display device;
    communicating, by the payment terminal, the payment presentation information to the payment processing service;
    determining, by the payment terminal, that the payment processing service is unavailable; and
    responsive to determining that the payment processing service is unavailable:
        determining, by the payment terminal, the amount of the transaction is less than a threshold amount;
        responsive to determining that the amount of the transaction is less than the threshold amount, encrypting, by the payment terminal, the payment presentation information;
        offloading, by the payment terminal, the encrypted payment presentation information to the POS terminal; and
        responsive to determining that the payment processing service is available:
            retrieving, by the payment terminal, the encrypted payment presentation information from the POS terminal; and
            transmitting, by the payment terminal, the encrypted payment presentation information to the payment processing service.

2. The method of claim 1, wherein offloading the encrypted payment presentation information comprises transmitting store-and-forward (SAF) information for the transaction to the POS terminal, and wherein the encrypted payment presentation information is included in the SAF information.

3. The method of claim 2, wherein the POS terminal is configured to store the SAF information in a transaction log entry for the transaction.

4. The method of claim 3, wherein the POS terminal is further configured to set a flag of the transaction log entry to indicate that the transaction log entry includes the SAF information.

5. The method of claim 2, wherein the POS terminal is configured to transmit a control signal to a printer device to print a barcode with the encrypted payment presentation information.

6. The method of claim 1, wherein the payment presentation information is encrypted using one of a token, a private encryption key, or a value specific to the payment terminal and the payment processing service.

7. The method of claim 1, wherein the threshold amount comprises a predefined amount.

8. A system for handling a communication failure between a payment terminal and a payment processing service, the system comprising:
    a point of sale (POS) terminal comprising a computer processor; and
    the payment terminal comprising:
        an input device comprising one or more of: a credit card reader, a display device, and a pin pad; and
        one or more computer processors isolated from the computer processor of the POS terminal to comply with a payment card industry (PCI) data security standard, the one or more computer processors configured to collectively:
            receive, from the POS terminal, an amount of a transaction;
            receive, using the input device, one or more user inputs comprising payment presentation information for the transaction, wherein the one or more user inputs comprise swiping a credit card in the credit card reader, holding the credit card proximate the credit card reader, or manually entering the payment presentation information using the pin pad or the display device;
            communicate the payment presentation information to the payment processing service;
            determine that the payment processing service is unavailable; and
            responsive to determining that the payment processing service is unavailable:
                determine the amount of the transaction is less than a threshold amount;
                responsive to determining that the amount of the transaction is less than the threshold amount, encrypt the payment presentation information;
                offload the encrypted payment presentation information from the payment terminal to the POS terminal; and
                responsive to determining that the payment processing service is available:
                    retrieve the encrypted payment presentation information from the POS terminal; and
                    transmit the encrypted payment presentation information to the payment processing service.

9. The system of claim 8, wherein offloading the encrypted payment presentation information comprises transmitting store-and-forward (SAF) information for the transaction to the POS terminal, and wherein the encrypted payment presentation information is included in the SAF information.

10. The system of claim 9, wherein the POS terminal is configured to store the SAF information in a transaction log entry for the transaction.

11. The system of claim 10, wherein the POS terminal is further configured to set a flag of the transaction log entry to indicate that the transaction log entry includes the SAF information.

12. The system of claim 9, wherein the POS terminal is configured to transmit a control signal to a printer device to print a barcode with the encrypted payment presentation information.

13. The system of claim 8, wherein the payment presentation information is encrypted using one of a token, a private encryption key, or a value specific to the payment terminal and the payment processing service.

14. The system of claim 8, wherein the threshold amount comprises a predefined amount.

15. A computer program product comprising a non-transitory computer readable medium storing computer-readable code, which when collectively executed by one or more computer processors of a payment terminal, performs an operation for handling a communication failure between the payment terminal and a payment processing service, the operation comprising:
- receiving, at the payment terminal and from a point of sale (POS) terminal, an amount of a transaction, wherein the payment terminal includes a computer processor that is isolated from a computer processor of the POS terminal to comply with a payment card industry (PCI) data security standard, wherein the payment terminal further includes an input device comprising one or more of a credit card reader, a display device, and a pin pad;
- receiving, at the payment terminal and from an input device of the payment terminal, one or more user inputs comprising payment presentation information for the transaction, wherein the one or more user inputs comprise swiping a credit card in the credit card reader, holding the credit card proximate the credit card reader, or manually entering the payment presentation information using the pin pad or the display device;
- communicating, by the payment terminal, the payment presentation information to the payment processing service;
- determining, by the payment terminal, that the payment processing service is unavailable; and
- responsive to determining that the payment processing service is unavailable:
  - determining, by the payment terminal, the amount of the transaction is less than a threshold amount;
  - responsive to determining that the amount of the transaction is less than the threshold amount, encrypting, by the payment terminal, the payment presentation information;
  - offloading, by the payment terminal, the encrypted payment presentation information to the POS terminal; and
- responsive to determining that the payment processing service is available:
  - retrieving, by the payment terminal, the encrypted payment presentation information from the POS terminal; and
  - transmitting, by the payment terminal, the encrypted payment presentation information to the payment processing service.

16. The computer program product of claim 15, wherein offloading the encrypted payment presentation information comprises transmitting store-and-forward (SAF) information for the transaction to the POS terminal, and wherein the encrypted payment presentation information is included in the SAF information.

17. The computer program product of claim 16, wherein the POS terminal is configured to store the SAF information in a transaction log entry for the transaction.

18. The computer program product of claim 16, wherein the POS terminal is configured to transmit a control signal to a printer device to print a barcode with the encrypted payment presentation information.

19. The computer program product of claim 15, wherein the payment presentation information is encrypted using one of a token, a private encryption key, or a value specific to the payment terminal and the payment processing service.

20. The computer program product of claim 15, wherein the threshold amount comprises a predefined amount.

* * * * *